(12) United States Patent
Dagan et al.

(10) Patent No.: US 10,038,744 B1
(45) Date of Patent: Jul. 31, 2018

(54) INTELLIGENT CORE ASSIGNMENT

(71) Applicant: EMC Corporation, Hopkinton, MA (US)

(72) Inventors: Hagay Dagan, Pardes Hanna-Karkur (IL); Ilies Idrissi, Allston, MA (US); Dan Aharoni, Brookline, MA (US); Gil Ratsaby, Mevaseret Zion (IL); Sergey Rytenkov, St. Petersburg (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 432 days.

(21) Appl. No.: 14/753,930

(22) Filed: Jun. 29, 2015

(51) Int. Cl.
*H04L 29/08* (2006.01)
*H04L 12/24* (2006.01)

(52) U.S. Cl.
CPC ...... *H04L 67/1008* (2013.01); *H04L 41/5054* (2013.01); *H04L 67/1097* (2013.01)

(58) Field of Classification Search
CPC ............. H04L 67/1008; H04L 41/5054; H04L 67/1097
USPC .......................................................... 709/226
See application file for complete search history.

(56) References Cited

U.S. PATENT DOCUMENTS

| | | | |
|---|---|---|---|
| 7,292,969 B1 | 11/2007 | Aharoni et al. | |
| 7,356,452 B1 | 4/2008 | Naamad et al. | |
| 7,392,360 B1 | 6/2008 | Aharoni et al. | |
| 7,640,342 B1 | 12/2009 | Aharoni et al. | |
| 8,467,281 B1 | 6/2013 | Colon et al. | |
| 8,843,714 B1 | 9/2014 | Smirnov et al. | |
| 8,880,801 B1 | 11/2014 | Robins et al. | |
| 9,201,802 B1 | 12/2015 | Armangau et al. | |
| 9,485,310 B1 | 11/2016 | Bono et al. | |
| 2006/0229861 A1* | 10/2006 | Tatsuoka | G06F 9/52 703/21 |
| 2007/0101318 A1* | 5/2007 | Tatsuoka | G06F 9/52 717/135 |
| 2009/0327944 A1* | 12/2009 | Sugure | G06F 17/5022 715/772 |

(Continued)

OTHER PUBLICATIONS

David Haase, et al.; "Coordination of File System Creation to Ensure More Deterministic Performance Characteristics," U.S. Appl. No. 14/319,764, filed Jun. 30, 2014.

(Continued)

*Primary Examiner* — Nicholas Taylor
*Assistant Examiner* — Chong G Kim
(74) *Attorney, Agent, or Firm* — BainwoodHuang (57) ABSTRACT

A method includes (a) receiving workload data for a data storage system, the data storage system having a plurality of processing cores, the data storage system being configured to operate according to any of a plurality of profiles, each of the plurality of profiles having a respective assignment of respective cores of the plurality of cores to particular storage roles of the data storage system, (b) for each profile of the plurality of profiles, simulating operation of the data storage system running a workload based on the received workload data using the assignment of respective cores of the plurality of cores to particular storage roles for that profile, thereby producing a set of utilization scores, (c) selecting a profile of the plurality of profiles based on the set of utilization scores, and (d) outputting an indication of the selected profile for use by the data storage system.

20 Claims, 5 Drawing Sheets

(56) References Cited

U.S. PATENT DOCUMENTS

| | | | |
|---|---|---|---|
| 2010/0058335 A1* | 3/2010 | Weber | G06F 9/45558 |
| | | | 718/1 |
| 2011/0218795 A1* | 9/2011 | Cho | G06F 9/44 |
| | | | 703/21 |
| 2012/0158394 A1* | 6/2012 | Cho | G06F 17/5022 |
| | | | 703/21 |
| 2013/0097384 A1* | 4/2013 | Suzuki | G06F 12/0815 |
| | | | 711/124 |
| 2013/0138886 A1* | 5/2013 | Yamauchi | G06F 9/544 |
| | | | 711/120 |
| 2016/0275220 A1* | 9/2016 | Kenney | G06F 9/4881 |
| 2017/0192885 A1* | 7/2017 | Lee | G06F 9/3017 |

OTHER PUBLICATIONS

Philippe Armangau, et al.; "Adaptive Thread Processing of IO Requests," U.S. Appl. No. 15/086,647, filed Mar. 31, 2016.

* cited by examiner

INTELLIGENT CORE ASSIGNMENT

BACKGROUND

Data storage systems are used to store large quantities of data. A typical data storage system includes a plurality of network interface ports configured to communicate with a plurality of host computers over one or more storage networks. The data storage system is then able to process commands received from these host computers using processing circuitry and disk interface circuitry coupled to a large number of disks.

Many modern data storage systems include several processors, each processor having multiple processing cores. This configuration allows multiple operations to be performed in parallel, enhancing the performance of the data storage system.

SUMMARY

Unfortunately, the above-described conventional systems may suffer from deficiencies. Some systems allocate different processing cores to different storage roles of the data storage system. This allocation may be controlled according to a pre-defined profile. An administrator of the data storage system may select between several such pre-defined profiles based on the needs of the system. However, a particular administrator may not be sufficiently expert to decide which profile would provide optimal performance. In addition, the inflexibility of having the profiles being pre-defined may result in an optimal core assignment not being available.

Thus, it would be desirable to provide techniques to assist an administrator in selecting an optimal profile for core assignment. It would also be desirable to provide techniques to automatically modify the core assignments of the various profiles based on actual usage data. These results may be accomplished by making use of historical workload data to analyze past usage patterns to select an optimal profile and/or to update a core assignment of a profile.

In one embodiment, a method is performed by a computing device. The method includes (a) receiving workload data for a data storage system, the data storage system having a plurality of processing cores, the data storage system being configured to operate according to any of a plurality of profiles, each of the plurality of profiles having a respective assignment of respective cores of the plurality of cores to particular storage roles of the data storage system, (b) for each profile of the plurality of profiles, simulating operation of the data storage system running a workload based on the received workload data using the assignment of respective cores of the plurality of cores to particular storage roles for that profile, thereby producing a set of utilization scores, (c) selecting a profile of the plurality of profiles based on the set of utilization scores, and (d) outputting an indication of the selected profile for use by the data storage system. An apparatus and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques to assist an administrator in selecting an optimal profile for core assignment and to automatically modify the core assignments of the various profiles based on actual usage data. These results may be accomplished by making use of historical workload data to analyze past usage patterns to select an optimal profile and/or to update a core assignment of a profile.

Figure 1:
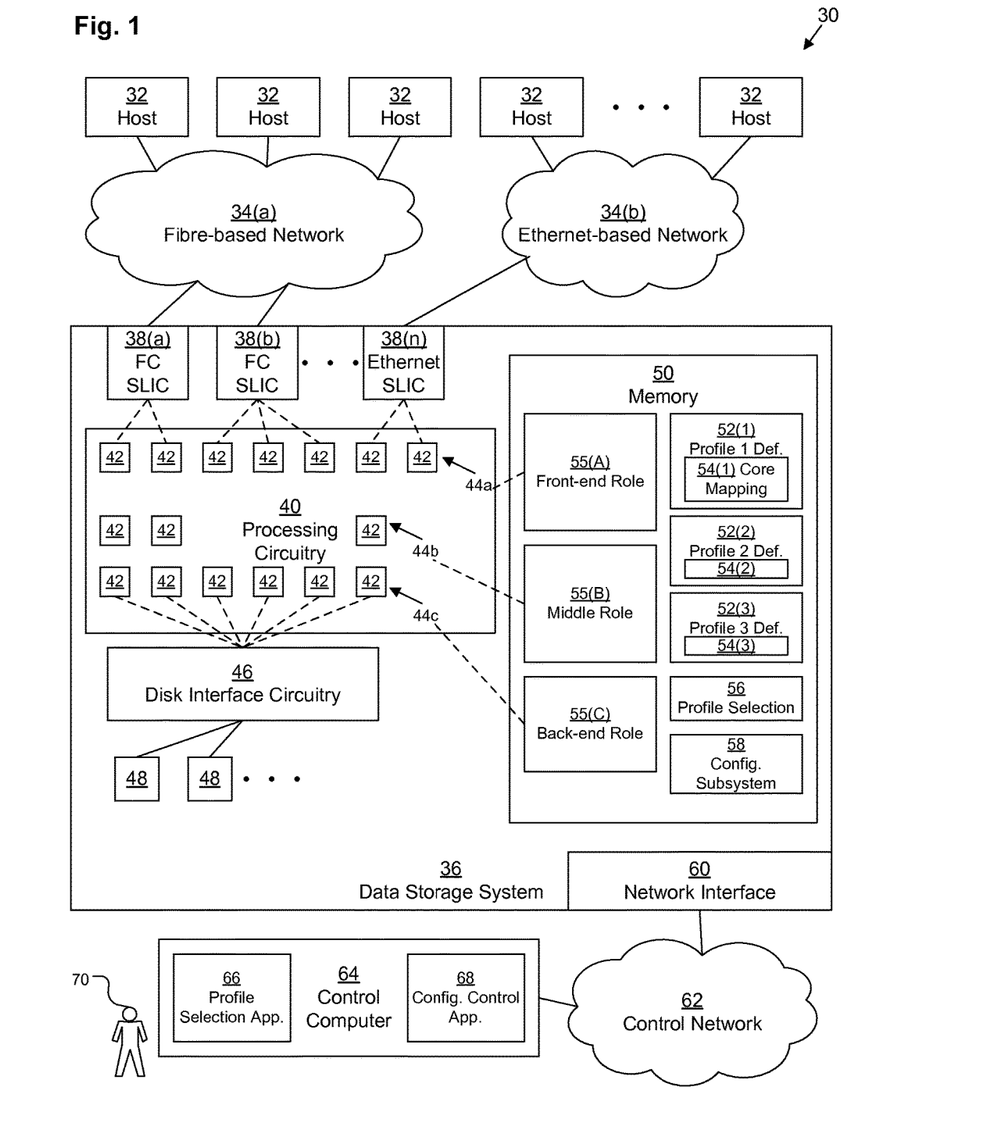
FIG. 1 is a block diagram depicting an example system or apparatus for use in connection with various embodiments.

FIG. 1 depicts a system 30. System 30 includes a set of host computers 32 connected to a data storage system (DSS) 30 over one or more storage networks 34. DSS 36 may be, for example, a VMAX® series enterprise data storage system or a VNX® series data storage system provided by the EMC Corporation of Hopkinton, Mass. DSS 36 is typically housed in one or more storage cabinets (not depicted). However, in some embodiments, DSS 36 may be a dispersed system operating across a network.

The one or more storage networks 34 may be of several different types. For example, as depicted, there is a Fibre Channel (FC) based network 34(a) and an Ethernet-based network 34(b). This allows the DSS 36 to communicate with hosts 32 over different types of connections as may be more beneficial to particular circumstances.

DSS 36 includes one or more storage network interfaces 38, processing circuitry 40 interconnected with memory 50 and storage interface circuitry 46 configured to provide access to a set of disks 48. As depicted, storage network interfaces 38 may include FC subscriber line interface cards (SLICs) 38(a), 38(b) for connecting to FC-based network 34(a) and Ethernet SLICs 38(n) for connecting to Ethernet-based network 34(a), in addition to other types of SLICs as needed.

Disk interface circuitry 46 may include one or more SCSI adapters, Fibre Channel adapters, any other devices configured to connect to disks 48, or some combination thereof. In some embodiments, disk interface circuitry 46 may also include adapters configured to provide access to remote disks.

Disks 48 may be any kind of persistent storage drives, such as, for example, magnetic hard disk drives and flash-based solid state disk drives. There may be any number of disks 48 in DSS 36. In an example system, there may be between forty-eight and 3,200 disks 48.

Processing circuitry 40 may be any kind of processor or set of processors configured to perform operations, such as, for example, a microprocessor, a multi-core microprocessor, a digital signal processor, a system on a chip, a collection of electronic circuits, a similar kind of controller, or any combination of the above. As depicted, processing circuitry includes a plurality of processing cores 42, for example, sixteen processing cores 42. Each processing core 42 may be a physical processing core or it may be a logical core. Thus, in one embodiment, processing circuitry may include two quad-core processors, each of which has four physical cores. However, these processors may also include virtualization or parallelization technology, such as, for example, Intel Hyper-threading, allowing each physical core to operate as two logical cores 42, providing eight logical cores 42 per processor, and sixteen logical cores 42 total. Other numbers of cores 42 are also possible, such as, for example, 24, 32, or 48.

Memory 50 may be any kind of digital system memory, such as, for example, random access memory (RAM). Memory 50 stores one or more operating systems in operation (not depicted, e.g., Linux, UNIX, Windows, or a similar operating system), various storage system management programs in operation (not depicted), and one or more applications executing on processing circuitry 40 as well as data used by those applications. Memory 50 may also include a storage pipeline (not depicted), such as, for example, an I/O stack, which is configured to process data storage operations directed at the disks 48 of the DSS 36 by operation of a layered series of drivers. The storage pipeline may be divided into a front-end portion and a back-end portion. The front-end portion of the storage pipeline may include drivers configured to process commands relating to host-facing addresses (e.g., LBAs on LUNs), while the back-end portion of the storage pipeline may include drivers configured to process commands relating to low-level disk-facing addresses (e.g., particular blocks on particular disks 48, the LUNs being distributed across several disks 48). In some embodiments, a cache (not depicted) is the dividing line between the front-end and the back-end. The front-end drivers may operate within a front-end storage role 55(A) within memory 50, while the back-end drivers may operate within a back-end storage role 55(C) within memory 50. In addition, a middle storage role 55(B) within memory 50 may operate other processes outside the storage pipeline (e.g., infrastructure management, system configuration, etc.). These storage roles 55 may also be referred to as "emulations."

Memory 50 stores a set of profile definitions 52 (depicted as profile definitions 52(1), 52(2), 52(3)), each of which includes a respective core mapping 54 (depicted as core mappings 54(1), 54(2), 54(3)). Memory 40 also stores a profile selection 56, which indicates a particular profile definition 52 whose core mapping 54 is used for processing circuitry 40. Memory 40 also stores a configuration subsystem 58, which may execute on processing circuitry 40 to allow the DSS 36 to be configured. In some embodiments, memory 50 may only store the set of profile definitions 52 and the profile selection 56 temporarily upon system startup; at other times the set of profile definitions 52 and the profile selection 56 may instead be stored on the disks 48.

The core mapping 54 of the profile definition 52 indicated by the profile selection 56 indicates an assignment of particular cores 42 to particular storage roles 55 of the DSS 36. For example, as depicted, eight cores 42 of a front-end set 44a are assigned to a front-end storage role 55(A) for interfacing with network interfaces 38, three cores 42 of a middle set 44b are assigned to middle storage role 55(B) for performing tasks out-of-band with the storage stack, and six cores 42 of a back-end set 44c are assigned to back-end storage role 55(C) for interfacing with disk interface circuitry 46. This depicted core assignment may be associated with a profile definition 52(1) referred to as a "front-end centric" profile, which is optimized for storage tasks that involve more host-facing operations (e.g., large sequential read operations that include mostly cached data, etc.). Another profile definition 52(3) may instead include a core mapping 54(3) that is "back-end centric," and optimized for storage tasks that involve more disk-facing operations (e.g., many local replications; small random read operations that include very little cached data, etc.), having relatively more cores 42 assigned to back-end set 44c. Another profile definition 52(2) may instead include a core mapping 54(2) that is "balanced" having a more equal distribution between front-end set 44a and back-end set 44c (and middle set 44b). In some embodiments, more than three storage roles 55 may be used. For example, a separate front-end storage role 55 may be used for every different type of storage network adapter 38 (e.g., FC over fiber, FC over Ethernet, iSCSI, FICON, RDF over fiber, RDF over Ethernet, etc.). Similarly, a separate back-end storage role 55 may be used for every different type of disk interface circuitry 46 used (e.g., one for SCSI, one for SAS, and one for remote disks).

DSS 36 includes a network interface 60 for connecting to a control network 62. Control network 62 connects to at least one control computer 64, which allows a user (e.g., a system administrator 70) to modify the profile selection 56 to toggle between the various profile definitions 52 using configuration control application 68, allowing the core assignment to be changed. In some embodiments (not depicted), DSS 36 also includes user interface (UI) circuitry for directly interfacing with a user, in which case the configuration control application 68 may run locally on the DSS 36 (e.g., within middle storage role 55(B)).

Administrator 70 may operate a profile selection application 66 on control computer 66 (or DSS 36) to enhance the core assignment process. By operating profile selection application 66, administrator 70 may be advised which profile definition 52 to select using configuration control application 68. In some embodiments, administrator 70 may operate profile selection application 66 to communicate directly with configuration control application 68 to automatically select the appropriate profile definition 52. Administrator 70 may also operate profile selection application 66 to update the core mappings 54 within one or more of the profile definitions 52 to provide for more optimal core assignments.

Figure 2:
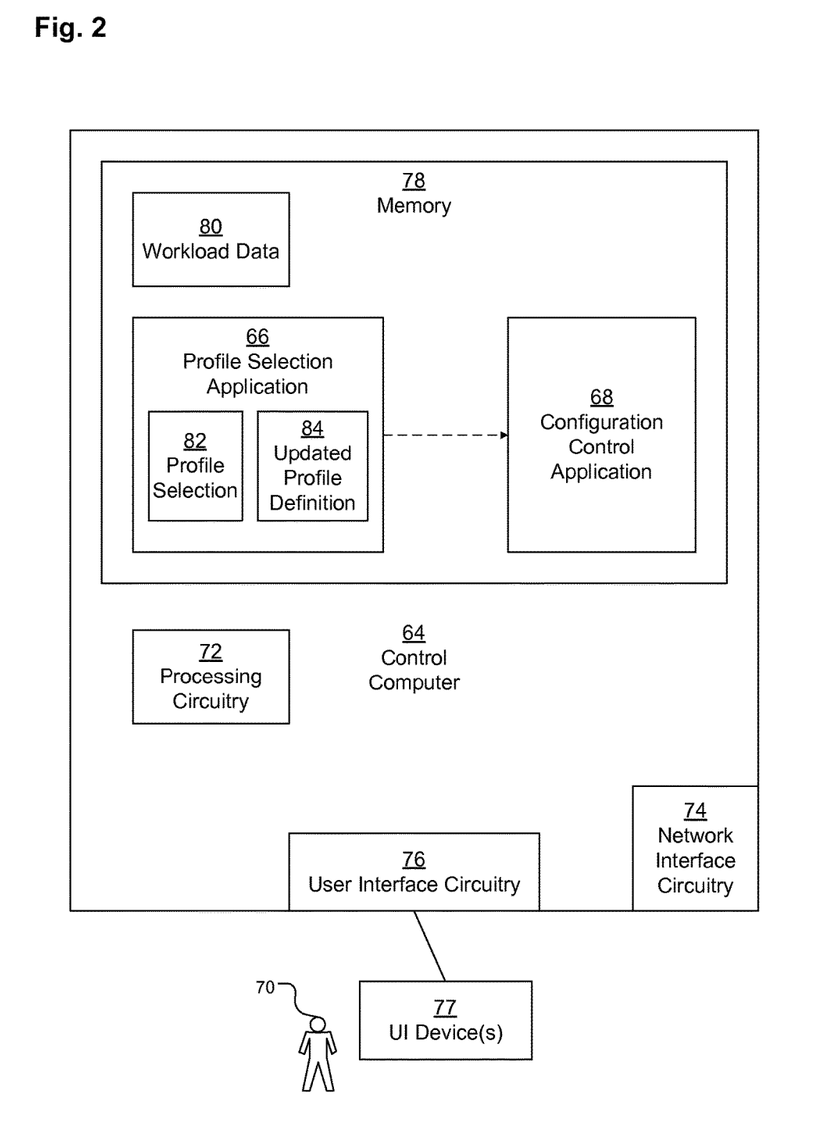
FIG. 2 is a block diagram depicting an example apparatus for use in connection with various embodiments.

FIG. 2 depicts an example control computer 64 in more detail. Control computer 64 includes interconnected processing circuitry 72, network interface circuitry 74, UI circuitry 76, and memory 78.

Processing circuitry 72 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Network interface circuitry 74 may include one or more Ethernet cards, cellular modems, FC adapters, Wireless Fidelity (WiFi) wireless networking adapters, any other devices for connecting to a network (e.g., a storage area network, a local area network, a wide area network, etc.), or some combination thereof.

UI circuitry 76 interfaces with one or more UI devices 77 that allow the administrator to input and receive data to and from the control computer 64. For example, UI circuitry 76 may include a serial bus adapter, a graphics adapter, etc., while UI devices 77 may include one or more of a display device (e.g., a CRT, LCD, plasma, or LED monitor) and an input device (e.g., a mouse, trackpad, tracking stick, keyboard, microphone, biometric sensor, etc.).

Memory 78 may be any kind of digital system memory, such as, for example, random access memory (RAM). Memory 78 stores an executing operating system (OS, not depicted) and one or more applications (e.g., profile selection application 66 and configuration control application 68) executing on processing circuitry 72 as well as data used by those applications (e.g., workload data 80, profile selection 82, updated profile definition 84, etc.).

In some embodiments, memory 78 may also include a persistent storage portion (not depicted). Persistent storage may be made up of one or more persistent storage devices, such as, for example, hard disk drives, solid-state storage devices, flash drives, etc. Persistent storage is configured to store programs and data even while the control computer 64 is powered off. The OS (e.g., Linux, UNIX, Windows, or a similar operating system) and the applications (e.g., profile selection application 66 and configuration control application 68) are typically stored in persistent storage so that they may be loaded into memory 78 from persistent storage upon a system restart. These applications, when stored in non-transient form either in the volatile portion of memory 78 or in persistent storage, form a computer program product. The processing circuitry 72 running one or more of these applications thus forms a specialized circuit constructed and arranged to carry out the various processes described herein.

In some embodiments, profile selection application 66 is used to select which profile definition 52 of the DSS 36 should be selected as the profile selection 56 (stored locally as profile selection 82). In some of these embodiments, the profile selection 82 is displayed to the administrator 70 for the administrator 70 to enter into configuration control application 68, which may operate on the same control computer 64 as the profile selection application 66 or on another separate control computer 64 or on the DSS 36 itself. In other embodiments, the profile selection application 66 communicates directly with the configuration control application 68 to allow the configuration control application 68 to directly update the profile selection 56 without interference by the administrator 70.

In some embodiments, profile selection application 66 is used to analyze one or more of profile definitions 52 and to modify the core mapping 54 within one or more of the profile definitions 52 to achieve better performance. In such embodiments, typically the profile selection application 66 communicates directly with the configuration control application 68 to allow the configuration control application 68 to directly update the profile definition(s) 52 on the DSS 36 without interference by the administrator 70.

Figure 3:
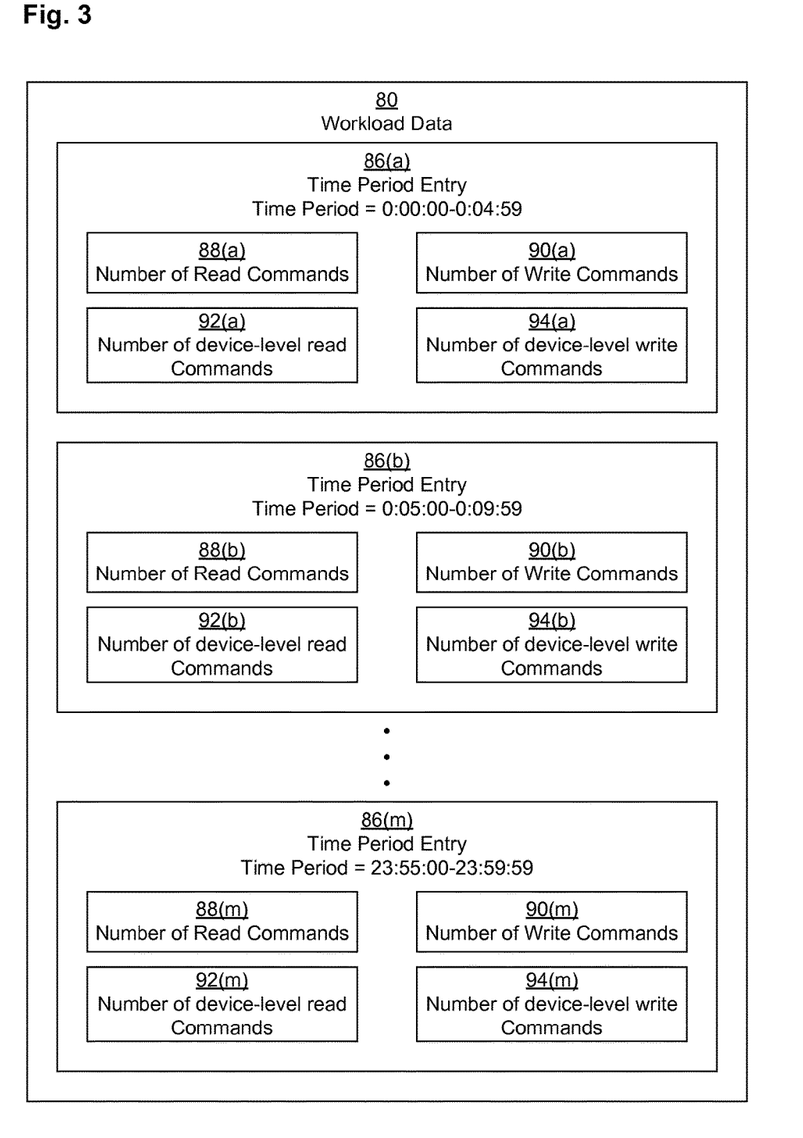
FIG. 3 is a block diagram depicting an example data structure for use in connection with various embodiments.

Profile selection application 66 makes use of workload data 80 both while selecting which profile definition 52 of the DSS 36 should be selected as the profile selection 56 and while analyzing one or more of profile definitions 52 to modify the core mapping 54 within one or more of the profile definitions 52 to achieve better performance. An example of workload data 80 is depicted in FIG. 3.

Workload data includes a set of time period entries 86 (depicted as time period entries 86(a), 86(b), ..., 86(m)). Each time period entry 86 is associated with a range of time values for a defined period of time. For example, as depicted, the time period is five minutes, and time period entry 86(a) is associated with the range of time from midnight (0:00:00) through 12:04:59 AM (0:04:59), while time period entry 86(b) is associated with the range of time from 12:05 AM (0:05:00) through 12:09:59 AM (0:09:59). Although a five minute period is depicted, any period length could be used, such as, for example, 10 seconds, 1 minute, 1 hour, etc. As depicted, the time period entries 86 cover a span of one day, although this is by way of example only.

Each time period entry 86 includes several data fields 88, 90, 92, 94. Thus, each time period entry 86 includes a number of read commands 88 issued by hosts 32 towards the DSS 36 during that time period 86. Similarly, each time period entry 86 includes a number of write commands 90 issued by hosts 32 towards the DSS 36 during that time period 86. In addition, each time period entry 86 includes a number of device-level read commands 92 issued by processing circuitry 40 to disk interface circuitry 46 during that time period 86. Similarly, each time period entry 86 includes a number of device-level write commands 94 issued by processing circuitry 40 to disk interface circuitry 46 during that time period 86.

In some embodiments (not depicted), workload data 80 also includes a similar set of time period entries 86 for each of several customers either on the same DSS 36 or on other similarly-configured DSSes.

Figure 4:
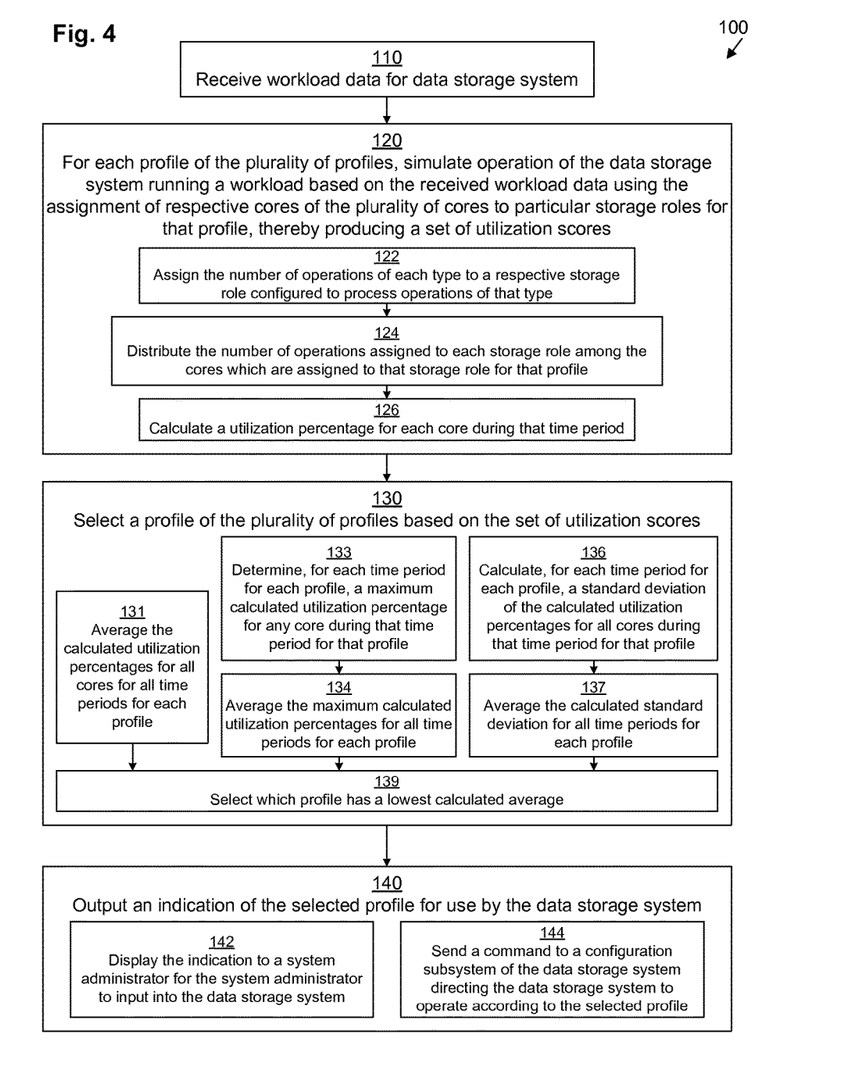
FIG. 4 is a flowchart depicting an example method according to various embodiments.

FIG. 4 illustrates an example method 100 performed by DSS 36 for assisting an administrator 70 in selecting an optimal profile definition 52 for core assignment. It should be understood that any time a piece of software (e.g., profile selection application 66 or configuration control application 68) is described as performing a method, process, step, or function, in actuality what is meant is that a computing device or distributed computing system (e.g., control computer 64 or DSS 36) on which that piece of software is running performs the method, process, step, or function when executing that piece of software on its processing circuitry 40, 72. It should be understood that although depicted in one order, one or more steps or sub-steps may be combined together or performed in a different order.

In step 110, profile selection application 66 receives workload data 80 for the DSS 36. In some embodiments, profile selection application 66 receives the workload data 80 directly from the DSS 36, while, in other embodiments, the administrator 70 loads the workload data 80 onto the control computer 64. Profile selection application 66 may also receive configuration information regarding the DSS 36, including the set of profile definitions 52 (including their respective profile definitions 54) the number and types of cores 42 of the DSS 36, the number and types of storage network interfaces 38 and disk interface circuitry 46 of the DSS 36, and the number and types of storage roles 55 running on the DSS 36.

In step 120, profile selection application 66 simulates, for each profile 52, the operation of the DSS 36 running a workload based on the received workload data 80 using the core mapping 54 for that respective profile 52, yielding a set of utilization scores. In some embodiments, step 120 may be accomplished by operation, for each profile definition 42 for each time period 86, of sub-steps 122, 124, and 126.

In sub-step 122, profile selection application 66 assigns the number of operations of each type (e.g., from fields 88-94) to a respective storage role 55 configured to process operations of that type. For example, the number of read commands 88 and the number of write commands 90 are both assigned to front-end storage role 55(A), and the number of device-level read commands 92 and the number of device-level write commands 94 are both assigned to back-end storage role 55(B).

In sub-step 124, profile selection application 66 distributes the number of operations assigned to each storage role 55 among the cores 42 which are assigned to that storage role 55 for that profile 52. Thus, for example, if the current profile is the front-end centric profile 52(1), the number of read commands 88(a) for time period 86(a) is 5,123, and the number of write commands 90(a) for time period 86(a) is 1,286, then the profile selection application 66 would distribute the 5,123 read commands and the 1,286 write commands between the seven cores 42 of the set 44a assigned to the front-end storage role 55(A).

Then, in sub-step 126, profile selection application 66 calculates the utilization percentage for each core 42 during the time period 86 for the given profile 52. This may be done with reference to average core utilizations resulting from typical operations (e.g., it may be pre-defined that the average write command uses 2% of one core for 400 milliseconds, while the average read command uses 1.5% of one core for 250 milliseconds). Thus, for each profile 52, a set of core utilizations is generated with separate values for each combination of each time period 86 with each core 42.

In step 130, profile selection application 66 selects a particular profile 52 based on the set of utilization scores generated in step 120. There are several ways this may be done. For example, FIG. 4 depicts three different ways to perform step 130.

In a first example approach, in sub-step 131, profile selection application 66 averages the calculated utilization percentages for all cores 40 for all time periods 86 for each profile 52. Thus, for example, for profile 52(A), profile selection application 66 may calculate an average utilization of 17% averaged over all sixteen cores and over the course of twenty-four hours; for profile 52(B) an average utilization of 25% averaged over all sixteen cores and over the course of twenty-four hours; and for profile 52(C) an average utilization of 37% averaged over all sixteen cores and over the course of twenty-four hours.

Then, in sub-step 139, profile selection application 66 selects which profile 52 has a lowest calculated average. Thus, in the above example, profile selection application 66 selects, as profile selection 82, profile 52(A) as having the lowest utilization percentage. In a second example approach, in sub-step 133, profile selection application 66 determines, for each time period 86 for each profile 52, a maximum calculated utilization percentage for any core 42 during that time period 86 for that profile 52. Thus, for example, during time period 86(a), profile 52(A) (which uses seven cores 42) has seven utilization scores, such as, for example, 12%, 14%, 19%, 37%, 9%, 41%, and 18%. Thus, in sub-step 133, profile selection application 66 determines that the maximum calculated utilization percentage for any core 42 during time period 86(a) for profile 52(A) is 41%.

Then, in sub-step 134, profile selection application 66 averages the maximum calculated utilization percentages for all time periods 86 for each profile 52. Thus, for example, for profile 52(A), there are 288 time entries 86, each of which has a maximum calculated utilization percentage, these 288 maximum calculated utilization percentages ranging between, for example, 12% and 47%. Upon averaging all 288 values, the resulting average might be 33%, while for profile 52(B) the resulting average maximum might be 31% and for profile 52(B) the resulting average maximum might be 36%.

Then, in sub-step 139, profile selection application 66 selects which profile 52 has a lowest calculated average. Thus, in the above example, profile selection application 66 selects, as profile selection 82, profile 52(B) as having the lowest maximum utilization percentage.

In a third example approach, in sub-step 136, profile selection application 66 determines, for each time period 86 for each profile 52, a standard deviation of the calculated utilization percentages for all cores 42 during that time period 86 for that profile 52. Thus, for example, during time period 86(a), profile 52(A) (which uses seven cores 42) has seven utilization scores, such as, for example, 12%, 14%, 19%, 37%, 9%, 41%, and 18%. Thus, in sub-step 136, profile selection application 66 determines that the standard deviation of the calculated utilization percentages for all cores 42 during time period 86(a) for profile 52(A) is about 12.528%.

Then, in sub-step 137, profile selection application 66 averages the calculated standard deviation for all time periods 86 for each profile 52. Thus, for example, for profile 52(A), there are 288 time entries 86, each of which has a calculated standard deviation, these 288 calculated standard deviation ranging between, for example, 8% and 21%. Upon averaging all 288 values, the resulting average might be 13%, while for profile 52(B) the resulting average maximum might be 18% and for profile 52(B) the resulting average maximum might be 10%.

Then, in sub-step 139, profile selection application 66 selects which profile 52 has a lowest calculated average. Thus, in the above example, profile selection application 66 selects, as profile selection 82, profile 52(C) as having the lowest calculated standard deviation.

After step 130, operation proceeds with step 140. In step 140, profile selection application 66 outputs an indication of the profile selection 82. In one embodiment, step 140 may be done by (sub-step 142) displaying the indication of the profile selection 82 to the system administrator 70 via the UI circuitry 76 for the system administrator 70 to input into the DSS 36 (e.g., by the system administrator selecting a profile 52 as indicated using configuration control application 68). In another embodiment, step 140 may be done by (sub-step 144) sending a command to the configuration subsystem 58 of the DSS 36 (e.g., via a signal to configuration control application 68) directing the DSS 36 to operate according to the profile selection 82, which causes the configuration subsystem 58 to update the profile selection 56 in memory 50.

Figure 5:
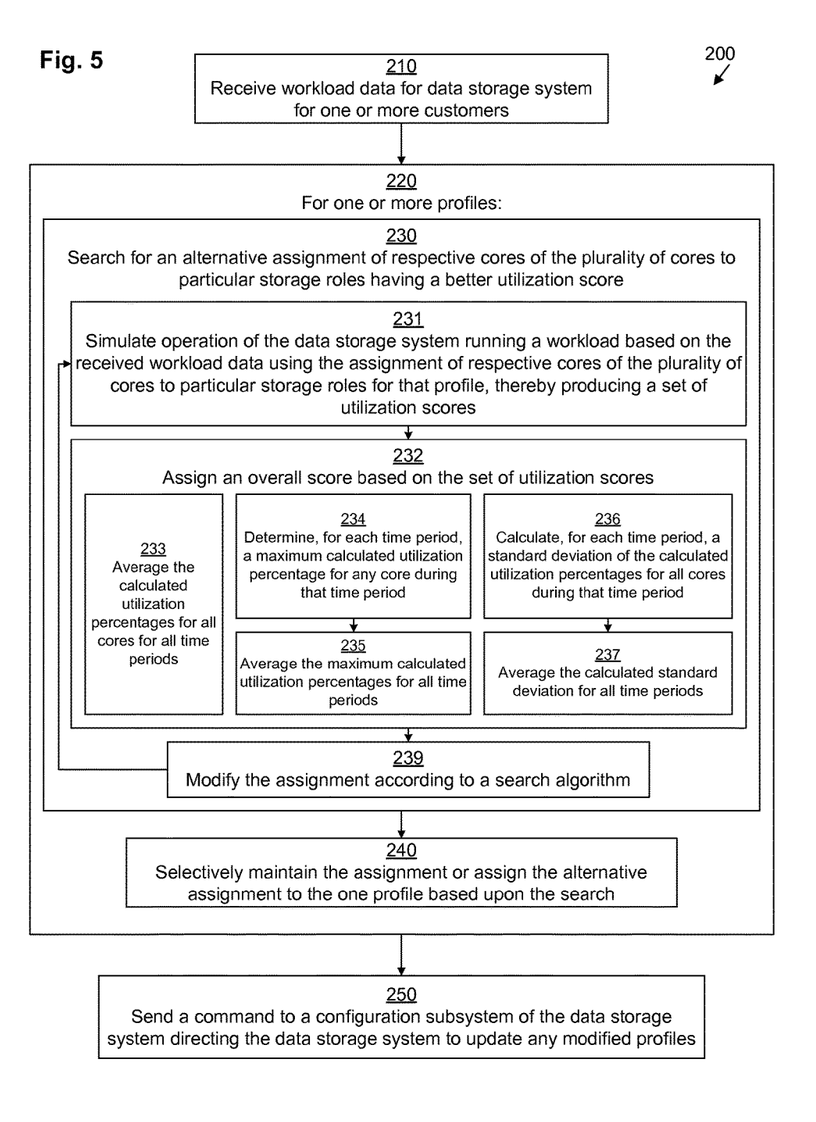
FIG. 5 is a flowchart depicting another example method according to various embodiments.

FIG. 5 illustrates an example method 200 performed by DSS 36 for automatically modifying the core mappings 54 of the various profile definitions 52 based on actual usage data. Method 200 may be performed by itself or it may be performed in conjunction with method 100.

In step 210, profile selection application 66 receives workload data 80 for the DSS 36 for one or more customers. In some embodiments, the received workload data 80 may include data from the DSS 36 in addition to data from other DSSes. In some embodiments, the received workload data 80 may include data from several different customers. In some embodiments, profile selection application 66 receives the workload data 80 directly from the DSS 36 or from a plurality of DSSes, while, in other embodiments, the administrator 70 loads the workload data 80 onto the control computer 64. Profile selection application 66 may also receive configuration information regarding the DSS 36 (or all of the DSSes for which workload data 80 was received), including the set of profile definitions 52 (including their respective profile definitions 54) the number and types of cores 42 of the DSS 36, the number and types of storage network interfaces 38 and disk interface circuitry 46 of the DSS 36, and the number and types of storage roles 55 running on the DSS 36.

In step 220, profile selection application 66 performs sub-steps 230 and 240 for one or more profiles 52.

In sub-step 230, profile selection application 66 searches for an alternative assignment of respective cores 42 to particular storage roles 55 having a better utilization score. Sub-step 230 may be performed in various ways, but one example is provided in sub-sub-steps 231, 232, and 239. In sub-sub-step 231, profile selection application 66 simulates operation of the DSS 36 running a workload based on the received workload data 80 using the assignment of respective cores 42 cores to particular storage roles 55 for that profile 52, thereby producing a set of utilization scores. Then, in sub-sub-step 232, profile selection application 66 assigns an overall score based on the set of utilization scores from sub-sub-step 231. There are various ways to assign this score. Three example approaches are depicted: sub-sub-sub-step 233; sub-sub-steps 234-235; and sub-sub-sub-steps 236-237. These approaches are similar to the approaches discussed above in connection with sub-steps 131-139. Then, in sub-sub-step 239, profile selection application 66 modifies the assignment of cores 42 according to any known search algorithm. In one example, profile selection application 66 removes one assigned core 42 from the storage role 55 having the lowest utilization score from sub-sub-step 232 and re-assigns that core to the storage role 55 having the highest utilization score from sub-sub-step 232 until no improvement is made. Then, operation loops back to sub-sub-step 231 to test the revised assignment for any improvement. Once no improvement is made, sub-step 230 terminates, although, in other search techniques, different modifications may be made.

In sub-step 240, profile selection application 66 selectively maintains the assignment or assigns the alternative assignment to the one profile 52 based upon the search of sub-step 230. Thus, if any improvement was made to the core mapping 54 of a profile 52, then the improved core mapping 54 is stored within updated profile definition 84.

Then, in step 250, profile selection application 66 sends (e.g., via a signal to configuration control application 68) a command to the configuration subsystem 58 of the DSS 36 directing the configuration subsystem 58 to update a profile 52 according to the updated profile definition 84. It should be understood that this may be done for several different profiles 52.

It should also be understood that, in embodiments in which the workload data 80 includes data for multiple customers, the searching within sub-step 230 may be done by averaging the score assignments (see sub-sub-step 232) for all customers together.

In some embodiments, after step 250 is performed, operation may proceed with step 120 of method 100.

Thus, techniques for assisting an administrator 70 in selecting an optimal profile definition 52 for core assignment and for automatically modifying the core mappings 54 of the various profile definitions 52 based on actual usage data have been provided.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method performed by a computing device coupled to a computer network, the method comprising:
   receiving workload data for a data storage system coupled to the computer network the data storage system having a plurality of processing cores, the data storage system being configured to operate according to any of a plurality of profiles, each of the plurality of profiles having a respective assignment of respective cores of the plurality of cores to particular storage roles of the data storage system, the workload data reflecting actual usage of the data storage system for storage-related operations;
   for each profile of the plurality of profiles, simulating operation of the data storage system running a workload based on the received workload data using the assignment of respective cores of the plurality of cores to particular storage roles for that profile, thereby producing a set of utilization scores;
   selecting a profile of the plurality of profiles based on the set of utilization scores; and
   outputting an indication of the selected profile for use by the data storage system;
   wherein outputting the indication of the selected profile for use by the data storage system includes sending a command to a configuration subsystem of the data storage system directing the data storage system to operate according to the selected profile by assigning cores of the plurality of cores to particular storage roles according to the assignment of the selected profile.

2. The method of claim 1 wherein:
   receiving the workload data includes receiving, for each of a plurality of time periods, a summary of numbers of various types of operations processed by the data storage system during that time period; and
   simulating operation of the data storage system includes, for each time period:
      assigning the number of operations of each type to a respective storage role configured to process operations of that type;
      distributing the number of operations assigned to each storage role among the cores which are assigned to that storage role for that profile; and
      calculating a utilization percentage for each core during that time period.

3. The method of claim 2 wherein selecting the profile of the plurality of profiles based on the set of utilization scores includes:
   averaging the calculated utilization percentages for all cores for all time periods for each profile; and
   selecting which profile has a lowest calculated average.

4. The method of claim 2 wherein selecting the profile of the plurality of profiles based on the set of utilization scores includes:
   determining, for each time period for each profile, a maximum calculated utilization percentage for any core during that time period for that profile;
   averaging the maximum calculated utilization percentages for all time periods for each profile; and
   selecting which profile has a lowest calculated average.

5. The method of claim 2 wherein selecting the profile of the plurality of profiles based on the set of utilization scores includes:
- calculating, for each time period for each profile, a standard deviation of the calculated utilization percentages for all cores during that time period for that profile;
- averaging the calculated standard deviation for all time periods for each profile; and
- selecting which profile has a lowest calculated average.

6. The method of claim 1 wherein the particular storage roles include:
- a front-end storage role for processing data storage commands received by a storage network interface from a client of the data storage system;
- a back-end storage role for processing back-end data storage commands directed at particular storage devices of the data storage system; and
- a middle storage role for performing operations out-of-band with an I/O path of the data storage system.

7. The method of claim 1 wherein the method further comprises, for one profile of the set of profiles:
- searching for an alternative assignment of respective cores of the plurality of cores to particular storage roles having a lower utilization score; and
- selectively replacing the assignment of the one profile with the alternative assignment based upon the search yielding a lower utilization score.

8. The method of claim 7 wherein searching for an alternative assignment of respective cores of the plurality of cores to particular storage roles having a lower utilization score includes:
- simulating operation of the data storage system running a workload based on the received workload data using the assignment of respective cores of the plurality of cores to particular storage roles for the one profile, thereby producing a set of test utilization scores;
- assigning an overall score to the one profile based on the set of test utilization scores; and
- modifying the assignment of respective cores of the one profile according to a search technique until no improvement is found in the assigned overall score for the one profile.

9. The method of claim 8 wherein:
- receiving the workload data includes receiving, for each of a plurality of time periods, a summary of numbers of various types of operations processed by the data storage system during that time period; and
- simulating operation of the data storage system to produce the set of test utilization scores includes, for each time period:
  - assigning the number of operations of each type to a respective storage role configured to process operations of that type;
  - distributing the number of operations assigned to each storage role among the cores which are assigned to that storage role for the one profile; and
  - calculating a utilization percentage for each core during that time period.

10. The method of claim 9 wherein assigning the overall score to the one profile based on the set of test utilization scores includes averaging the calculated utilization percentages for all cores for all time periods for the one profile.

11. The method of claim 9 wherein assigning the overall score to the one profile based on the set of test utilization scores includes:
- determining, for each time period for the one profile, a maximum calculated utilization percentage for any core during that time period for the one profile; and
- averaging the maximum calculated utilization percentages for all time periods for the one profile.

12. The method of claim 9 wherein assigning the overall score to the one profile based on the set of test utilization scores includes:
- calculating, for each time period for the one profile, a standard deviation of the calculated utilization percentages for all cores during that time period for the one profile; and
- averaging the calculated standard deviation for all time periods for the one profile.

13. The method of claim 8 wherein modifying the assignment of respective cores of the one profile according to the search technique includes re-assigning a core from a storage role having a lowest utilization score to another storage role having a highest utilization score.

14. An apparatus comprising:
- network interface circuitry;
- memory; and
- processing circuitry coupled to the network interface circuitry and the memory, the processor being configured to:
  - receive workload data for a data storage system, the data storage system having a plurality of processing cores, the data storage system being configured to operate according to any of a plurality of profiles, each of the plurality of profiles having a respective assignment of respective cores of the plurality of cores to particular storage roles of the data storage system, the workload data reflecting actual usage of the data storage system for storage-related operations;
  - for each profile of the plurality of profiles, simulate operation of the data storage system running a workload based on the received workload data using the assignment of respective cores of the plurality of cores to particular storage roles for that profile, thereby producing a set of utilization scores;
  - select a profile of the plurality of profiles based on the set of utilization scores; and
  - send a command, via the network interface, to a configuration subsystem of the data storage system directing the data storage system to operate according to the selected profile by assigning cores of the plurality of cores to particular storage roles according to the assignment of the selected profile.

15. A system comprising:
- a computer network;
- a computerized data storage system coupled to the computer network, the data storage system having a plurality of processing cores, the data storage system being configured to operate according to any of a plurality of profiles, each of the plurality of profiles having a respective assignment of respective cores of the plurality of cores to particular storage roles of the data storage system; and
- a control apparatus coupled to the computer network, the control apparatus including processing circuitry coupled to memory configured to:
  - receive workload data for the data storage system, the workload data reflecting actual usage of the data storage system for storage-related operations;
  - for each profile of the plurality of profiles, simulate operation of the data storage system running a workload based on the received workload data using the assignment of respective cores of the plurality of cores to particular storage roles for that profile, thereby producing a set of utilization scores;

select a profile of the plurality of profiles based on the set of utilization scores; and send a command, via the computer network, to a configuration subsystem of the data storage system directing the data storage system to operate according to the selected profile;

wherein the data storage system is configured to receive the command from the control apparatus over the computer network and, in response, operate according to the selected profile by assigning cores of the plurality of cores to particular storage roles according to the assignment of the selected profile.

16. The system of claim 15 wherein:

receiving the workload data includes receiving, for each of a plurality of time periods, a summary of numbers of various types of operations processed by the data storage system during that time period; and simulating operation of the data storage system includes, for each time period:

assigning the number of operations of each type to a respective storage role configured to process operations of that type;

distributing the number of operations assigned to each storage role among the cores which are assigned to that storage role for that profile; and calculating a utilization percentage for each core during that time period.

17. The system of claim 15 wherein the particular storage roles include:

a front-end storage role for processing data storage commands received by a storage network interface from a client of the data storage system;

a back-end storage role for processing back-end data storage commands directed at particular storage devices of the data storage system; and a middle storage role for performing operations out-of-band with an I/O path of the data storage system.

18. The system of claim 15 wherein the control apparatus is further configured to, for one profile of the set of profiles:

search for an alternative assignment of respective cores of the plurality of cores to particular storage roles having a lower utilization score; and selectively replace the assignment of the one profile with the alternative assignment based upon the search yielding a lower utilization score.

19. The apparatus of claim 14 wherein:

receiving the workload data includes receiving, for each of a plurality of time periods, a summary of numbers of various types of operations processed by the data storage system during that time period; and simulating operation of the data storage system includes, for each time period:

assigning the number of operations of each type to a respective storage role configured to process operations of that type;

distributing the number of operations assigned to each storage role among the cores which are assigned to that storage role for that profile; and calculating a utilization percentage for each core during that time period.

20. The apparatus of claim 14 wherein the particular storage roles include:

a front-end storage role for processing data storage commands received by a storage network interface from a client of the data storage system;

a back-end storage role for processing back-end data storage commands directed at particular storage devices of the data storage system; and a middle storage role for performing operations out-of-band with an I/O path of the data storage system.

\* \* \* \* \*